Sept. 7, 1965  J. A. KAYSER  3,204,429
CENTERING DEVICE
Filed Aug. 30, 1962

Sept. 7, 1965   J. A. KAYSER   3,204,429
CENTERING DEVICE
Filed Aug. 30, 1962

United States Patent Office 3,204,429
Patented Sept. 7, 1965

1

3,204,429
CENTERING DEVICE
John A. Kayser, Oregon, Ohio, assignor to Dana Corporation, Toledo, Ohio, a corporation of Virginia
Filed Aug. 30, 1962, Ser. No. 220,506
4 Claims. (Cl. 64—21)

This invention relates to centering devices in general and more specifically to a centering device for use with a ball type constant velocity universal joint.

Ball type constant velocity universal joints, comprising outer and inner races drivingly connected by driver balls and including means for maintaining the balls in a homokinetic plane, are well known in the art. These joints may be of the type wherein the races are fixed against relative axial telescoping movement or the type wherein the races may move axially, thereby telescoping or slipping relative to each other. The telescoping of the races of the ball joint readily takes place because of the drive ball engagement therebetween.

The latter type of axially movable joint is limited in the amount of axial movement between the races by the dimensions of the joint and the angle at which the same is operating. Accordingly, at large angles only a small amount of relative axial movement may be accommodated in contrast to a larger amount of axial movement when operating at reduced angles.

This limited amount of telescoping presents a problem in certain joint applications such as used in particular drive shafts of a vehicle. A vehicle drive shaft must include means for accommodating variations in distance between the rear axle of the vehicle and the prime mover and in addition the shaft must accommodate angular changes caused by vertical movement and rotation of the rear axle relative to the vehicle resulting from conditions such as variations in the vehicle load, vertical jounce of the rear axle, and acceleration and deceleration of the vehicle. Variations in the above length requirements also arise from the tolerance requirement in the construction of the vehicle so that drive shaft length requirements from vehicle to vehicle of the same design often vary.

Accordingly, the vehicle tolerance from greatest to least length displacement between the rear axle and prime mover and changes in drive line length due to load changes may be sufficient to preliminarily use a substantial amount of the telescoping capacity of the joint so that there will be little or no capacity remaining to accommodate secondary changes in drive line length due to vertical jounce of the rear axle resulting from road operating conditions. This vertical jounce takes place while torque is being transferred by the drive line. Therefore, in joint applications such as above, it is desirable to have a preliminary telescoping arrangement combined with the aforementioned ball type constant velocity telescoping joint in the drive line, which additional arrangement may, but need not, accommodate angular displacement of the rear axle relative to the vehicle.

This preliminary telescoping arrangement may take the form of a relatively simple sleeve yoke and spline shaft assembly which easily telescopes in the absence of torque loads thereon, while, when transmitting torque loads the same has a great resistance to telescoping due to friction. The ball type constant velocity universal joints easily accommodate relative axial displacement even at high torque loads. However, means must be provided in such a combined drive line to insure that the preliminary telescoping from load variations and tolerance requirements is accommodated by the preliminary telescoping arrangement, since the ball type universal joint will readily telescope and tend to accommodate the preliminary length variation. These means should be operative to maintain the constant velocity universal joint in a neutral position during the telescoping of the preliminary arrangement while allowing the joint to accommodate length variation when the drive line is transmitting torque and the preliminary arrangement may be frictionally restrained from telescoping.

It is, therefore, an object of this invention to provide an axially movable (telescoping) ball type constant velocity universal joint for a drive line having another telescoping arrangement therein, which constant velocity universal joint includes means maintaining the joint in a neutralized telescoping position during preliminary no-torque telescoping of the other slip arrangement.

It is another object of this invention to provide an axially movable ball type constant velocity universal joint, which joint includes means resiliently resisting the telescoping movement thereof.

It is yet another object of this invention to provide such a telescoping joint wherein means resiliently bias the same to a neutral telescoping position.

It is a further object of this invention to provide such a resiliently biased universal joint for use in a drive line having a preliminary telescoping arrangement therein, wherein the biasing means maintains the joint in a neutralized telescoping condition while the preliminary arrangement accommodates preliminary length adjustment of the drive line and which biasing means allows the universal joint to telescope and adjust the length of the drive line when the preliminary arrangement is no longer operative to do so.

Further and other objects of this invention will become apparent upon a consideration of the following specification when taken in conjunction with the drawings wherein.

Figure 1:
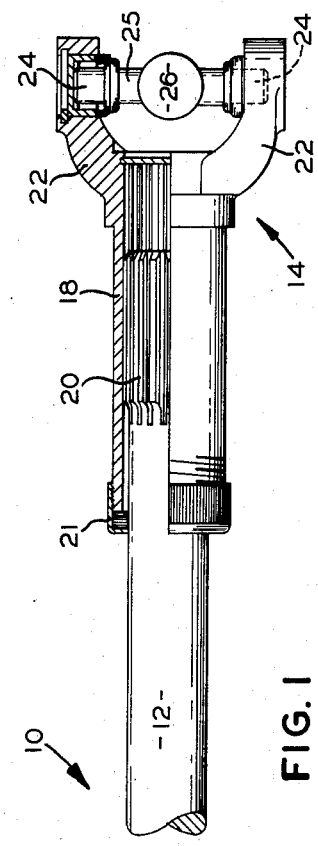
FIG. 1 is a view, partially in section, of a drive line including a telescoping constant velocity universal joint embodying this invention.

In a preferred embodiment of this invention a vehicle drive line, capable of transmitting torque from the prime mover of a vehicle to the rear axle thereof, is provided with a pair of axially movable or telescoping means adapted to accommodate changes in length in the vehicle drive line. The first telescoping means consist of a conventional internally splined sleeve yoke slidable receiving therein an externally splined stub shaft. When no torque is being transmitted by the drive line, this first telescoping means accommodates changes in length by the easy axial slipping of the stub shaft in the sleeve yoke; however, when torque is being transmitted by the drive line, frictional forces resisting such axial slipping are induced in this arrangement so that the same frictionally resists changes in length of the drive line.

The second telescoping means provided in the drive line is in the form of an axially movable or telescoping ball type constant velocity universal joint, which joint is adapted to accommodate both axial and angular displacement of the drive line. Since the inner and outer races of the universal joint are drivingly connected by a plurality of driver balls, even when transferring a high level of torque, the races of the universal joint will easily move axially relative to each other thereby accommodating changes in length of the drive line.

Means is provided to maintain the drive balls of the constant velocity universal joint in a homokinetic plane constantly bisecting the angle defined by the intersection of the axes of the inner and outer races. More particularly, a plurality of pilot means, one of which is associated with each driver ball, is provided to position the driver balls in the homokinetic plane. The pilot means are slidably received by the inner race and pivotally engage the outer race so that upon relative axial movement or telescoping between the races, the inner race moves axially relative to the pilot means while the pilot means remain stationary relative to the outer race. Resilient means are provided to maintain the pilot means and the inner race in a central or neutral position relative to each other so that the pilot means does not become inadevrtently positioned at either end of the inner race and unable to accommodate further relative axial movement in that direction. The resilient means are chosen with a biasing force sufficient to bias the pilot means and inner race to a neutral position while the stub shaft and sleeve yoke move axially relative to each other to accommodate preliminary changes in the length of the drive line. When the drive line is transmitting torque so that the frictional resistance of the stub shaft and sleeve yoke to relative axial movement is of a substantial value, then the races of the constant velocity universal joint will move axially relative to each other against the biasing effect of the resilient means.

Referring now to the drawings, a vehicle drive shaft shown generally at 10 includes an intermediate elongated shaft portion 12 interconnecting a pair of telescoping arrangements 14 and 16. The arrangement 14 comprises an internally splined sleeve yoke 18 telescopically receiving for axial movement relative thereto an externally splined stub shaft 20 which may be formed integrally with the shaft portion 12. A seal 21 is threadedly attached to the open end of the yoke 18 and slidably engages the shaft 20 to prevent the ingress of contaminants and egress of lubricant from the splinded engagement. The sleeve yoke 18 is provided with a pair of opposed lugs 22 which lugs pivotally receive opposed trunnions 24 of a journal cross 25. The journal cross 25 is adapted to be connected by means of a second pair of opposed pivot means, one of which is shown at 26, to either the prime mover or the rear axle of a vehicle (now shown).

The other telescoping arrangement 16 is in the form of a ball type constant velocity universal joint and comprises an outer race 27, in the form of a three piece housing interconnected by a plurality of bolts 28, an inner race 30, formed as an integral enlarged portion of the shaft 12 and disposed within the outer race 27, a plurality of torque transmitting means in the form of driver balls 32 received in cooperating grooves in the outer and inner races 27 and 30 for transmitting torque therebetween, and a plurality of pilot means 34, one of which is associated with each driver ball 32 for positioning the same. More particularly, the races 27 and 30 are provided with a plurality of paired, cooperating axially extending grooves 35 and 36, respectively, which cooperating grooves 35 and 36 each receive a driver ball 32. The radially inner portion of each groove 36 is formed as a second smaller groove 38 adapted to receive a pilot means 34 in an axially slidable manner so that the inner race 30 may slide axially relative thereto.

The pilot means 34 are provided with a central spherical depression 40 in registration with the driver ball 32 so that movement of the pilot means 34 is transmitted to the driver ball 32 contained therein. The axial ends of the pilot means 34 are formed as cam surfaces 42 which cooperate for pivotal movement with cam surfaces 44 on the outer race 27 so that upon relative angular movement between the outer and inner races 27 and 30 the pilot means 34 will be cammed to a position whereby the plane defined by the driver balls 32 bisects the angle determined by the intersection of the axes of the outer and inner races 27 and 30.

Figure 3:
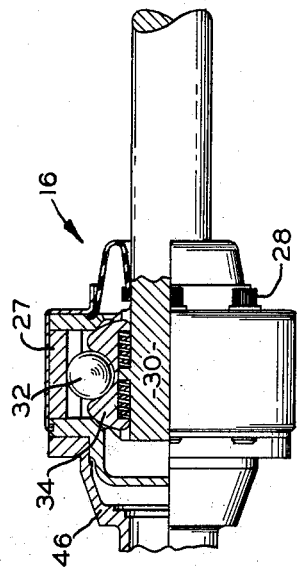
FIG. 3 is a view taken along the line 3—3 in Fig. 2.
Figure 3:
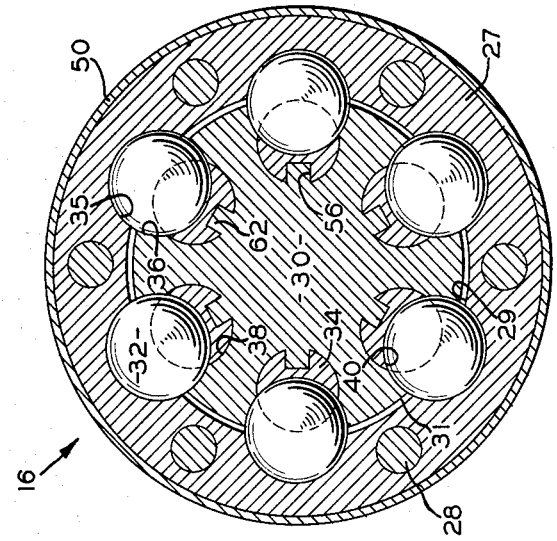
Figure 2:
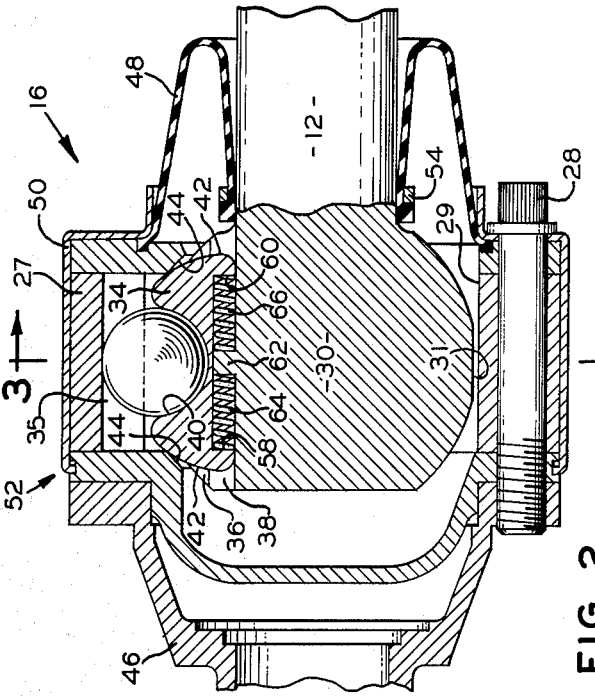
FIG. 2 is an enlarged sectional view of the constant velocity universal joint of this invention.
Figure 1:
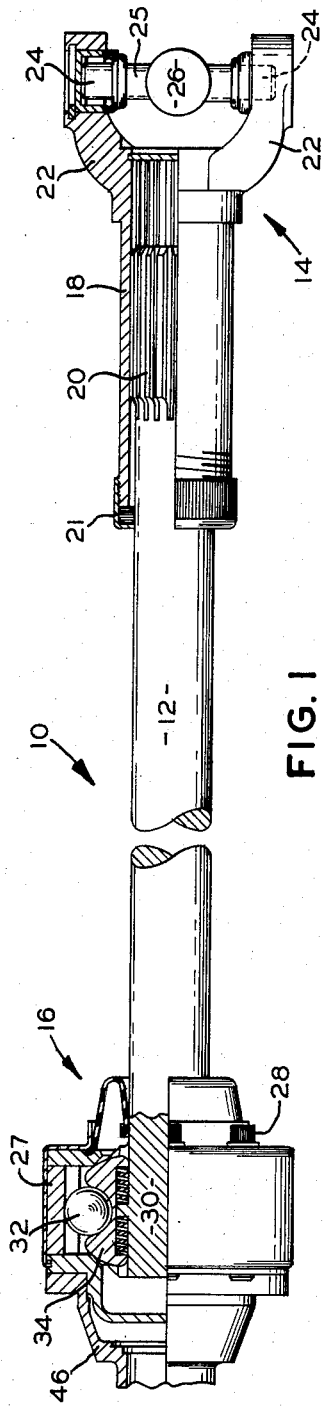
Figure 3:
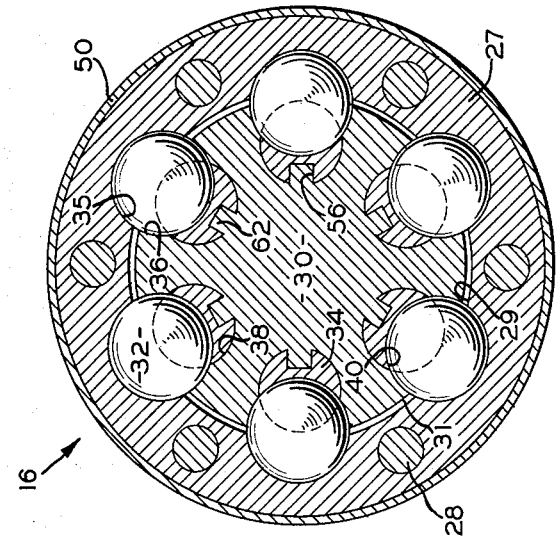
Figure 2:
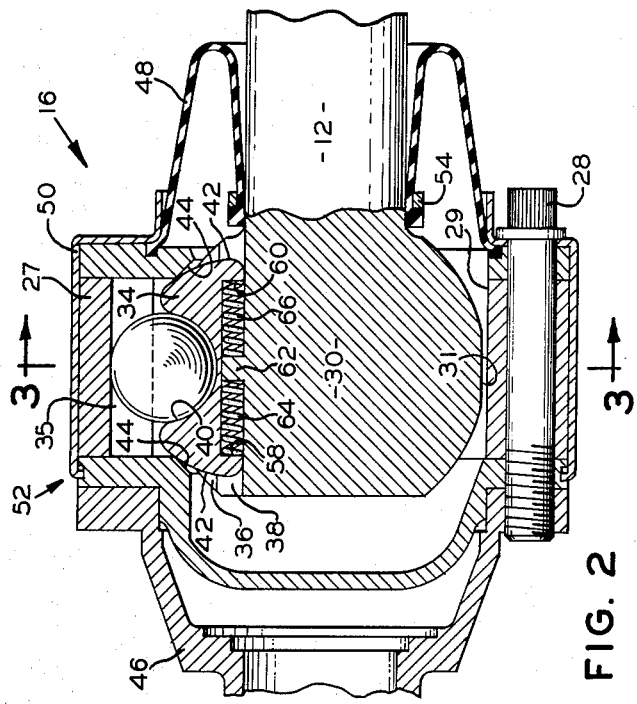

As clearly seen in FIG. 3 the inner diameter 29 of the outer race 27, and the outer diameter 31 of the inner race 30, are spaced from each other so that relative axial or telescoping movement between the races may take place. Since the pilot means 34 pivotally engage the outer race 27, no relative axial movement may take place therebetween; however, since the inner race 30 slidably receives the pilot means 34 in the pilot grooves 38, relative axial movement may take place between the inner race and the pilot means and therefore between the inner race and the outer race 27. Inasmuch as torque is transferred between the outer and inner races 27 and 30 by means of the driver balls 32, relative axial movement between the outer and inner races takes place with a much lower degree of friction than relative axial movement between the sleeve yoke 18 and the stub shaft 20 which transmit torque through an elongated splined engagement.

The outer race 27 is suitably secured to a flange yoke shown fragmentarily at 46 as by the plurality of bolts 28, which yoke 46 is adapted to be secured to the prime mover or rear axle of the vehicle (not shown). A resilient sealing means 48 is secured in abutting relationship to the outer race 27 by the abutment therewith of an annular cover 50 securedly engaging the outer race 27 as shown generally at 52. The other end of the resilient sealing means 48 is secured to the shaft 12 by means of an annular ring 54 so that the universal joint 16 is suitably protected from the entrance of contaminants and the leakage of lubricant.

Means is provided to bias the inner race 30 to a centralized or neutral position relative to the pilot means 34 and the outer race 27. More particularly, each pilot means 34 is provided with an axially extending slot 56 provided in the basal portion thereof, which slot terminates at its axial ends in a pair of spaced shoulders 58 and 60. Medially positioned in each pilot groove 38 in the inner race 30 is a radially outwardly extending shoulder 62 carried by the inner race and disposed in the slot 56 for axial movement relative thereto. Interposed between the shoulder 62 and the shoulders 58 and 60 of the pilot means 34 and disposed within the slot 56 are a pair of resilient means in the form of coiled compression springs 64 and 66. The compression springs 64 and 66 are selected with a substantially equal biasing effect so that the shoulder 62 is biased to a position intermediate the shoulders 58 and 60. Since the pilot means 34 is held against axial movement relative to the outer race 27, the biasing effect of the springs 64 and 66 will tend to position the inner race 30 centrally with respect to the pilot means 34 and thereby with respect to the outer race so that the same may move axially relative to the pilot means an equal amount both into and out of the outer race 27 by compressing the springs 64 and 66.

The springs 64 and 66 are selected so that their biasing effect upon the inner race 30 will be greater than the frictional resistance to relative axial movement between the sleeve yoke 18 and the stub shaft 20 when no torque is being transmitted by the drive shaft 10. When torque is being transferred by the drive shaft 10, the frictional resistance to relative axial movement between the sleeve yoke 18 and the stub shaft 20 increases at a much greater rate than the frictional resistance to relative axial movement between the outer and inner races 27 and 30 of the universal joint 16. Accordingly, upon an increase in the torque transmitted by the shaft 10, the biasing effect of the springs 64 and 66 restraining relative axial movement between the races 27 and 30 will be overcome by the forces urging length changes in the drive line, such as axle jounce, so that the slip arrangement 16 will accommodate such secondary changes in length.

While only a single embodiment of this invention has been shown and described, it is apparent that many changes may be made in both the structure and operation thereof without departing from the scope of this invention as defined by the following claims.

What is claimed is:

1. A telescoping ball type constant velocity universal joint comprising in combination
   (1) an outer race, (2) an inner race disposed in said outer race and adapted for axial movement relative thereto, (3) a plurality of torque transmitting means disposed between said races and operative to transmit torque therebetween, (4) means for maintaining said torque transmitting means in the homokinetic plane bisecting the angle defined by said races, (5) and resilient means biasing said races to a neutralized telescoping position whereby the same may telescope in opposite directions from said neutral position when said resilient means is overcome.

2. A universal joint according to claim 1 wherein one of said races and said maintaining means are axially movable relative to each other, and said resilient means biases said maintaining means and said one race to a neutralized telescoping position.

3. A universal joint according to claim 2 wherein said maintaining means pivotally engages the other of said races.

4. A constant velocity universal joint comprising in combination
   (1) an outer race,
   (2) an inner race telescopically received in said outer race and axially movable relative thereto,
   (3) said races having cooperating groove means therein,
   (4) a plurality of drive balls with one disposed in each of said cooperating grooves,
   (5) a separate pilot means associated with each of said driver balls and slidably received within the grooves of said inner race,
   (6) and a plurality of resilient means disposed between said pilot means and said inner race and operative to maintain the same in a neutralized axially displaced position whereby telescopic movement of said inner and outer races is resisted by the biasing effect of said resilient means.

References Cited by the Examiner

UNITED STATES PATENTS

| 1,287,030 | 12/18 | Jones | 64—8 |
| 1,843,211 | 2/32 | Davis. | |
| 2,051,085 | 8/36 | Ilseman | 64—8 |
| 2,139,963 | 12/38 | Leason | 64—21 |
| 2,352,776 | 7/44 | Dodge | 64—21 |
| 2,427,237 | 9/47 | Suczek | 64—21 |
| 3,105,369 | 10/63 | Mazziotti et al. | 64—21 |

FOREIGN PATENTS 501,171   2/39   Great Britain.

ROBERT C. RIORDON, *Primary Examiner.*

RALPH H. BRAUNER, *Examiner.*